(12) United States Patent
Ray et al.

(10) Patent No.: US 6,424,638 B1
(45) Date of Patent: Jul. 23, 2002

(54) SYSTEM AND METHOD FOR PERFORMING AN INTER MOBILE SYSTEM HANDOVER USING THE INTERNET TELEPHONY SYSTEM

(75) Inventors: Dipankar Ray, Richardson; Vladimir Alperovich, Dallas, both of TX (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 09/316,310

(22) Filed: May 21, 1999

(51) Int. Cl.[7] .................................................. H04Q 7/00
(52) U.S. Cl. ........................ 370/331; 455/426; 455/432; 455/433; 455/434; 455/438; 455/560; 370/334
(58) Field of Search ................................. 455/426, 432, 455/434, 435, 438, 439, 560, 436, 440; 370/331, 334, 401, 465, 466

(56) References Cited

U.S. PATENT DOCUMENTS

| | | | | |
|---|---|---|---|---|
| 5,301,359 A | * | 4/1994 | Van den Heuvel et al. | |
| 5,790,528 A | * | 8/1998 | Muszynski | 370/331 |
| 5,859,879 A | * | 1/1999 | Bolgiano et al. | 375/347 |
| 5,862,480 A | * | 1/1999 | Wild et al. | 455/432 |
| 5,978,679 A | * | 11/1999 | Agrre | 455/442 |
| 6,035,197 A | * | 3/2000 | Haberman et al. | 455/439 |
| 6,119,006 A | * | 9/2000 | Shaffer et al. | 455/440 |
| 6,157,834 A | * | 12/2000 | Helm et al. | 455/436 |
| 6,178,337 B1 | * | 1/2001 | Spartz et al. | 455/561 |
| 6,226,527 B1 | * | 5/2001 | Dalsgaard et al. | 455/553 |
| 6,314,108 B1 | * | 11/2001 | Ramasubramani et al. | 370/465 |

FOREIGN PATENT DOCUMENTS

GB        2292286       * 2/1996 .............. H04Q/7/38

* cited by examiner

Primary Examiner—Lester G. Kincaid
Assistant Examiner—Khawar Iqbal
(74) Attorney, Agent, or Firm—Jenkens & Gilchrist, P.C.

(57) ABSTRACT

A telecommunications system and method is disclosed for utilizing an Internet telephony system to perform a handover of a call between different types of systems. When a serving mobile switching center (MSC) determines that there is not another MSC belonging to the same type of wireless system to which a handover can be performed, the serving MSC sends a message to an Internet Gatekeeper via an Internet Gateway for the serving MSC, inquiring whether there are any other types of wireless systems nearby. The Internet Gatekeeper maintains a database of all existing wireless systems within the area served by the Internet Gatekeeper. The Internet Gatekeeper chooses a target MSC of another wireless system (if possible), and transmits the identity of this target MSC back to the currently serving MSC. Thereafter, the currently serving MSC performs the handover to the target MSC by routing signaling messages through the Internet Gateway and the Internet Gatekeeper to the target MSC.

34 Claims, 5 Drawing Sheets

SYSTEM AND METHOD FOR PERFORMING AN INTER MOBILE SYSTEM HANDOVER USING THE INTERNET TELEPHONY SYSTEM

BACKGROUND OF THE PRESENT INVENTION

1. Field of the Invention

The present invention relates generally to telecommunications systems and methods for performing a handover of a wireless call, and specifically to performing a handover of a wireless call between two different types of wireless systems.

2. Background of the Present Invention

Wireless telecommunications is one of the fastest growing and most demanding telecommunications applications. Today it represents a large and continuously increasing percentage of all new telephone subscriptions around the world. The development of wireless telecommunications has evolved from analog radio frequency (RF) technology into digital RF technology. The main types of analog systems are: Advanced Mobile Phone System (AMPS), Nordic Mobile Telephone (NMT) and Total Access Communications System (TACS). Within the digital systems, the main types are as follows: Global System for Mobile Communications (GSM), Time-Division Multiple Access (TDMA), of which the Digital-AMPS (DAMPS) system is one kind, and Code-Division Multiple Access (CDMA).

In addition, there are two world standards for these types of technologies: American National Standards Institute (ANSI) for the United States and Canada, and Consultative Committee for International Telephone and Telegraph (CCIT) for virtually the rest of the world. The ANSI standards focus on the AMPS and D-AMPS technologies, while the CCIT standards focus on the NMT and GSM standards.

With all of these different types of wireless communications systems available, seamless roaming from one type of system to another has posed significant problems for the industry. For example, if a mobile subscriber is involved in a wireless call, and the call needs to be handed over to another type of system in order to continue the call, conversion and interface devices are needed to perform this task. One device that exists today to perform such handovers between D-AMPS and GSM systems is a Roam-Free Gateway (RFG), formerly known as an Interworking Location Register (ILR). The RFG acts as a gateway that converts the protocols of the signaling and voice communications between the systems to enable the two systems to communicate effectively in order to perform call handovers. However, the RFG device only works handovers between the D-AMPS and GSM systems. Other conversion and interface devices must be used for other types of systems. Implementing each of these devices has proved extremely difficult and costly for network providers.

SUMMARY OF THE INVENTION

The present invention is directed to telecommunications systems and methods for utilizing an Internet telephony system to perform a handover of a call between different types of wireless systems. When a serving mobile switching center (MSC) determines that there is not another MSC belonging to the same type of wireless system to which a handover can be performed, the serving MSC sends an identity message to an Internet Gatekeeper via an Internet Gateway for the serving MSC. This identity message inquires whether there are any other types of wireless systems nearby. The Internet Gatekeeper maintains a database of all existing wireless systems within the area served by the Internet Gatekeeper. The Internet Gatekeeper chooses a target MSC of another wireless system (if possible), and transmits the identity of this target MSC back to the currently serving MSC. Thereafter, the currently serving MSC performs the handover to the target MSC by routing signaling messages and voice or data communications through the Internet Gateways and the Internet Gatekeeper to the target MSC.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
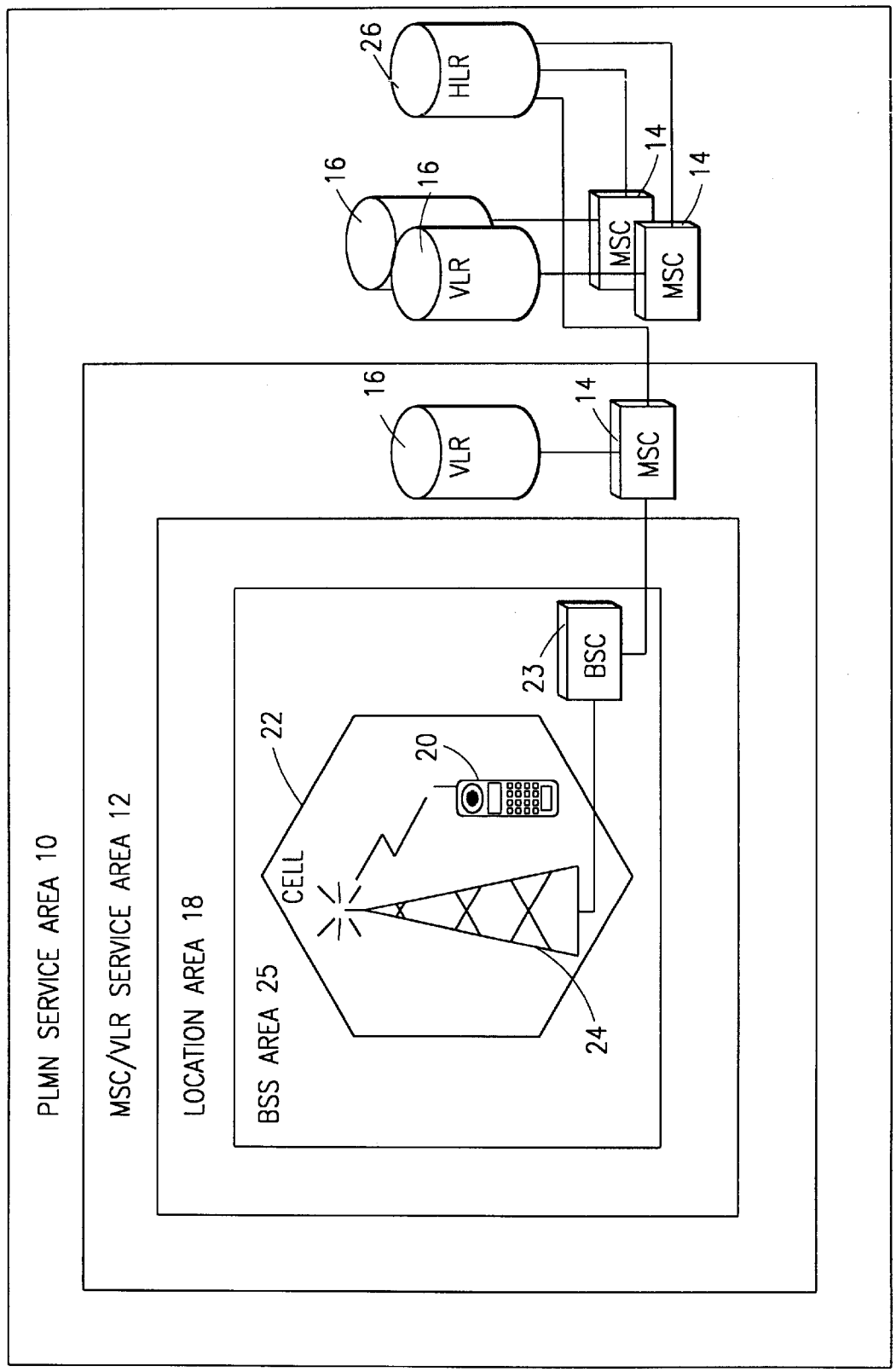
FIG. 1 is a block diagram of a conventional Global System for Mobile Communications (GSM) wireless system.

With reference now to FIG. 1 of the drawings, an example of a wireless telecommunications system is shown. FIG. 1 illustrates a Global System for Mobile Communications (GSM) system. However, it should be understood that the illustration of a GSM system is only for exemplary purposes, and the basic functionalities shown here may be implemented differently by different types of systems.

Within the GSM system, there are a number of Public Land Mobile Networks (PLMNs), such as wireless network 10, each owned and operated by different network providers. A PLMN 10 is typically composed of a plurality of areas 12, each with a Mobile Switching Center (MSC) 14 and a Visitor Location Register (VLR) 16 therein. The MSC/VLR areas 12, in turn, include a plurality of Location Areas (LA) 18, which are defined as that part of a given MSC/VLR area 12 in which a Mobile Station (MS) 20 may move freely without having to send update location information to the MSC/VLR 14/16 that controls the LA 18. Each LA 18, in turn, is divided into a number of cells 22. The MS 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS 24 is the physical equipment, illustrated for simplicity as a radio tower, that provides radio coverage to the geographical part of the cell 22 for which it is responsible. It should be understood that the BSC 23 may be connected to several BTS's 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the MS's 20 currently located within the MSC/VLR area 12. If an MS 20 roams into a new MSC/VLR area 12, the VLR 16 connected to that MSC 14 will request data about that MS 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

Figure 2A:
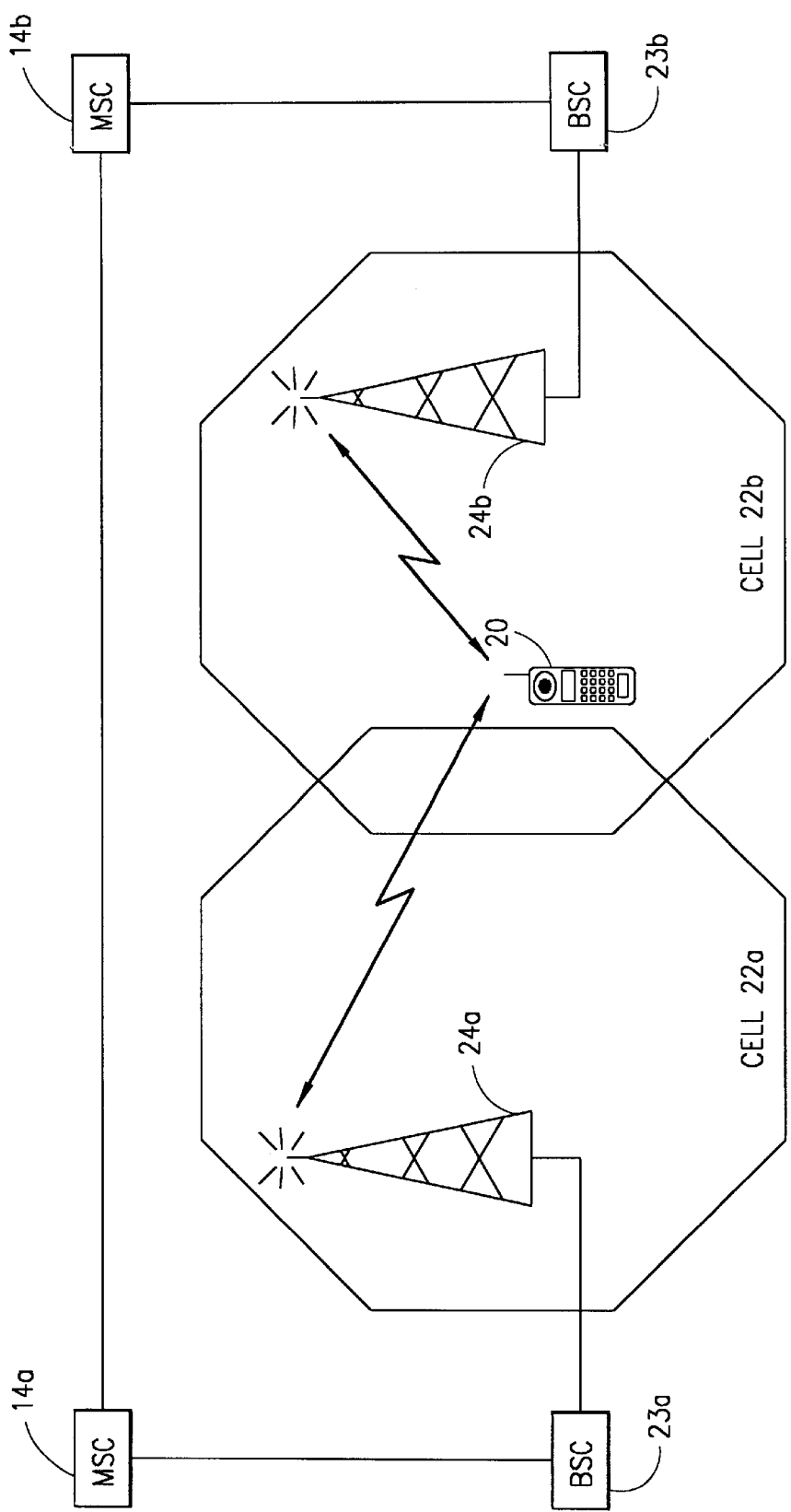
FIG. 2A illustrates a handover of a call between cells belonging to different Mobile Switching Centers (MSCs) within the same type of wireless system.
Figure 2B:
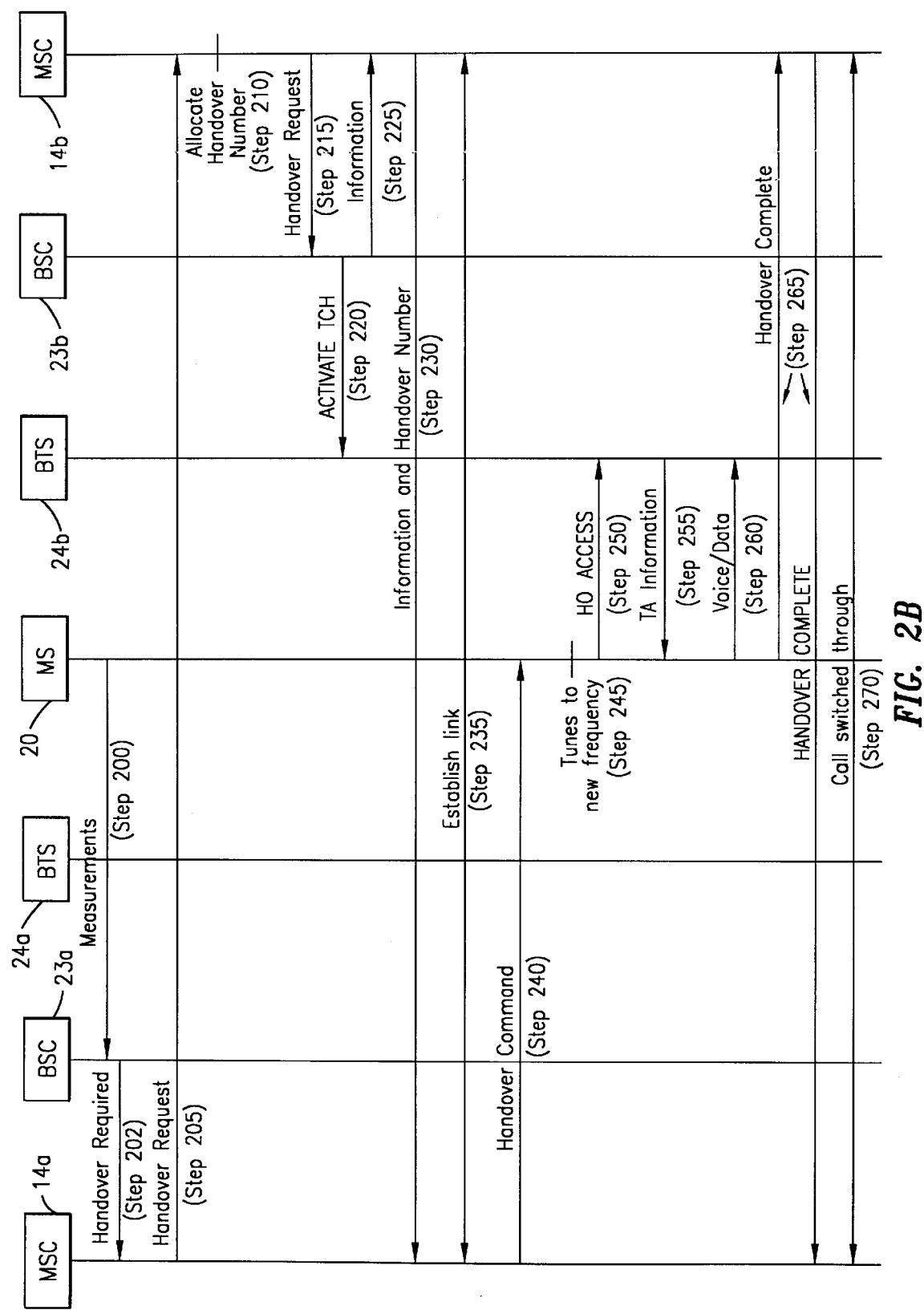
FIG. 2B illustrates the steps for performing the handover between the two MSC's shown in FIG. 2A of the drawings.

With reference now to FIG. 2A of the drawings, which will be described in connection with the steps listed in FIG. 2B of the drawings, when an MS 20 is involved in a call connection with a called party (shown here as a wireline subscriber within the Public Switched Telephone Network), the MS 20 may roam from one cell 22a into another cell 22b. The process of changing cells during a call is referred to as a handover. In order to choose the best target cell 22b to handover the call to the MS 20 and BTSs 24a and 24b must collect measurements, which are processed in the serving BSC 23a (step 200). In this example, the two cells 22a and 22b are controlled by different MSCs 14a and 14b.

For the handover to take place, the currently serving BSC 23a sends a Handover required message to the currently serving MSC 14a, together with the identity of the target cell 22b (step 202). The serving MSC 14a realizes that this target cell 22b belongs to another MSC 14b, and sends a Handover request message to the target MSC 14b (step 205). This target MSC 14b allocates a handover number in order to reroute the call (step 210) and transmits a Handover request to the target BSC 23b (step 215). The target BSC 23b orders the target BTS 24b to activate a traffic channel (step 220), and sends a message to the target MSC 14b containing information about the frequency, time slot and output power that the MS 20 must use (step 225). The target MSC 14b passes this information, along with the handover number, to the serving MSC 14a (step 230). Thereafter, a link is set up between the serving and target MSCs 14a and 14b, respectively (step 235).

To complete the handover, the serving MSC 14a transmits a Handover command containing the frequency, time slot and output power information to the MS 20, via the old BSC 23a (step 240). The MS 20 tunes to the new frequency (step 245) and transmits Handover Access bursts to the target BTS 24b in the correct time slot (step 250). Once the target BTS 24b detects the Handover Access bursts, the target BTS 24b sends information about the Timing Advance for transmissions from the MS 20 to the target BTS 24b (step 255), and the MS 20 begins to transmit voice, data and signaling information to the target BTS 24b (step 260). Thereafter, the MS 20 sends a Handover Complete message to the previously serving MSC 14b via the target BSC 23a and target MSC 14b (step 265), and the call is switched through from the previously serving MSC 14a to the target MSC 14b (step 270). The previously serving MSC 14a retains the main control of the call until the call is cleared. After call release, the MS 20 must perform a location update to the target MSC 14b to register with this new MSC 14b.

The above example describes a handover between MSC's 14a and 14b belonging to the same type of wireless system. However, if the two MSC's 14a and 14b belonged to different types of wireless systems, e.g., MSC 14a belonged to the GSM system, while MSC 14b belonged to the D-AMPS system, a conversion and interface device would have to be involved to convert the signaling messages and voice or data communications between the two systems in order to allow the two MSCs 14a and 14b to communicate with each other.

Figure 3:
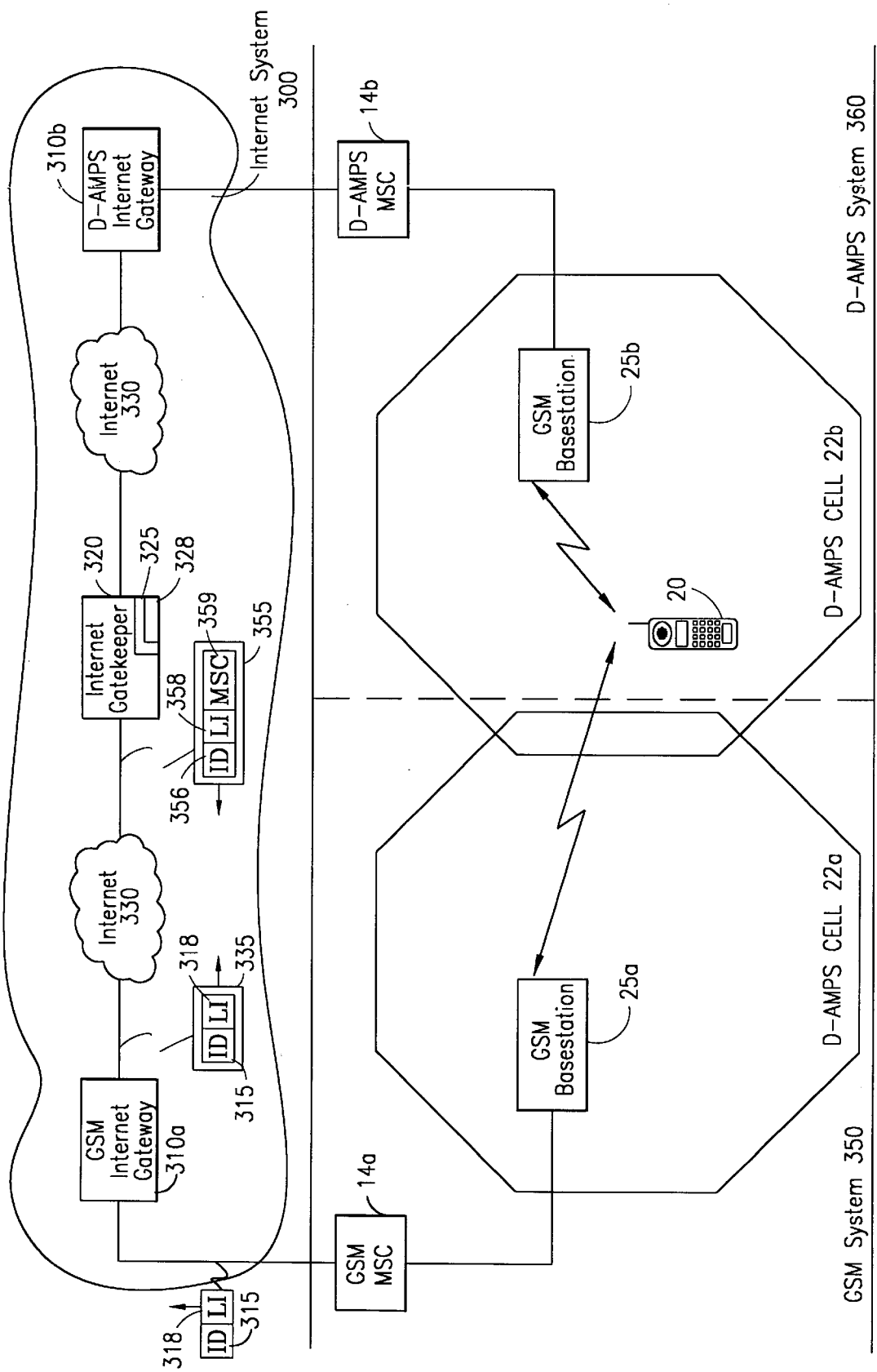
FIG. 3 illustrates a handover of a call between cells belonging to different MSC's, in which each MSC belongs to a different type of wireless system, in accordance with preferred embodiments of the present invention.
Figure 4:
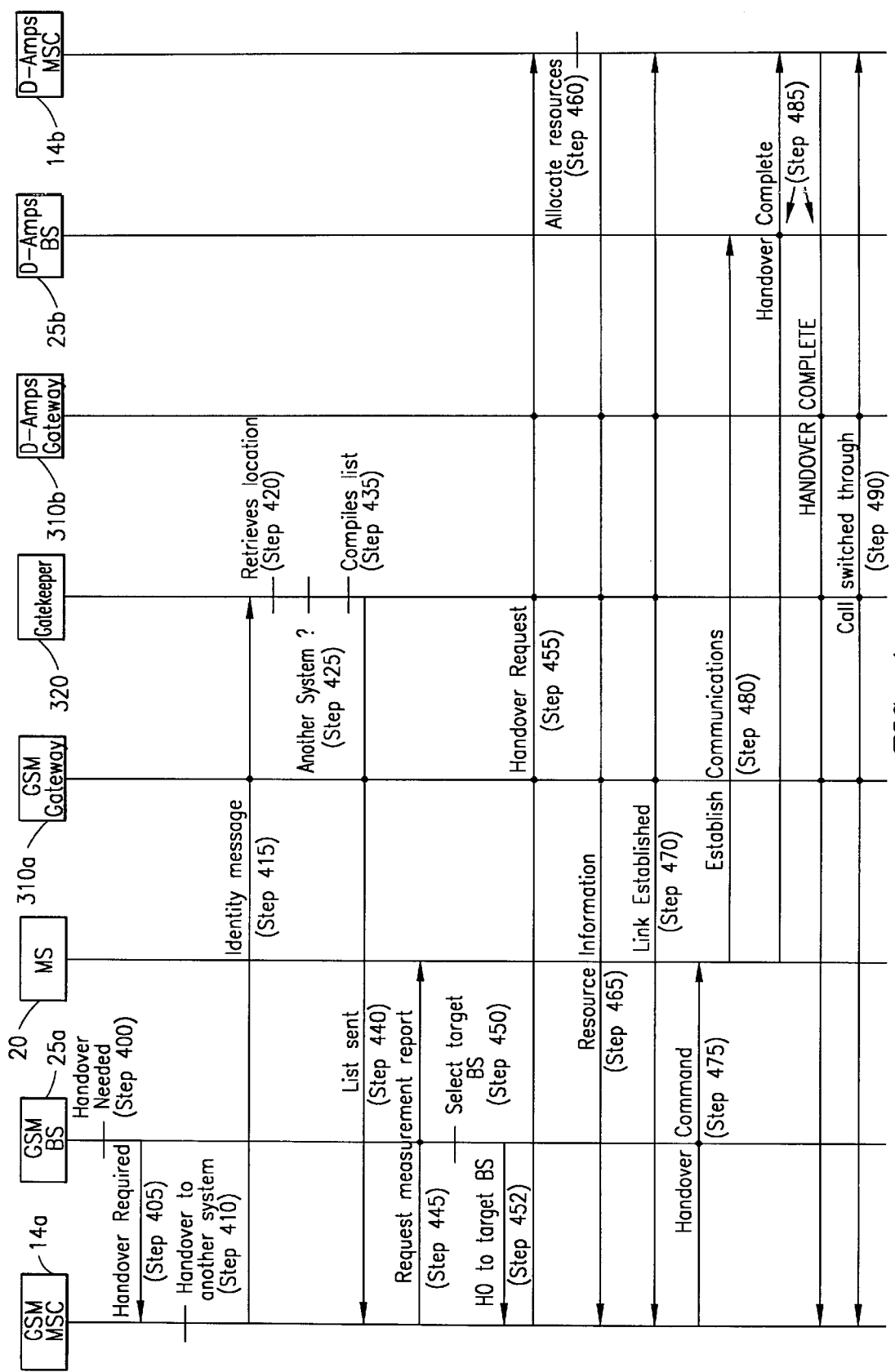
FIG. 4 illustrates the steps for performing the handover shown in FIG. 3 of the drawings.

Therefore, in accordance with preferred embodiments of the present invention, as shown in FIG. 3 of the drawings, which will be described in connection with the steps illustrated in FIG. 4 of the drawings, an Internet telephony system 300 can be utilized to perform the conversion for handovers between different types of wireless systems. As an example, in FIG. 3, the handover is being performed from a GSM system 350 to a D-AMPS system 360. However, it should be understood that the below-described solution will work between any two types of wireless systems 350 and 360. However, the specific signaling messages used for handover procedures may vary between systems.

In the GSM system 350, after the MS 20 and the currently serving base station 25a, which includes the BSC 23 and BTS 24 components shown in FIG. 1 of the drawings, complete their measurement reports and the serving base station 25a determines that a handover needs to be performed (step 400), and the base station 25a sends the Handover required message to the GSM MSC 14a (step 405). It should be understood that the decision to perform a handover is made differently by different wireless systems. For example, in the D-AMPS system, the MSC 14b makes the decision to perform a handover based upon the measurement reports.

At this point, since there is not another GSM cell 22a to handover the call to, the GSM MSC 14a concludes that the handover must be performed to another wireless system (step 410). Therefore, in accordance with aspects of the present invention, the currently serving GSM MSC 14a sends an identity message 315, including location information 318, e.g., X, Y coordinates and preferably a coverage area radius, for the GSM base station 25a, to an Internet Gatekeeper 320 via an Internet Gateway 310a for the GSM system 350 (step 415). The GSM Internet Gateway 310a converts the GSM identity message 315 into Internet Protocol (IP) packets 335 containing the identity message 315 and location information 318, and routes the IP packets 335 through an Internet 330 to the Internet Gatekeeper 320 for the area that includes the GSM MSC 14a. This identity message 315 preferably inquires whether there are any other types of wireless systems nearby that the call can be handed over to. Alternatively, the GSM MSC 14a may have knowledge about the existence of another type of system nearby, and the identity message 315 may seek confirmation of the existence of the other type of system from the Internet Gatekeeper 320.

The Internet Gatekeeper 320 maintains a database 325 of all existing wireless systems 350 and 360 in the area served by the Internet Gatekeeper 320. This database 325 may be located within the Internet Gatekeeper 320 itself or, less preferably, it may be stored at a remote location (not shown) that is accessible by the Internet Gatekeeper 320. Within the database 325, the Internet Gatekeeper 320 stores specific identity information 328, such as location information, e.g., X, Y coordinates and a coverage area radius, of each base station 25a and 25b and the identity of their corresponding MSCs 14a and 14b within the Internet Gateway 320 area. It should be noted that the term "base station," as used herein for the DAMPS system 360, is analogous to at least the BTS 24 (shown in FIG. 1) of the GSM system 350.

When the Internet Gatekeeper 320 retrieves the base station 25a location information 318 from the identity message 315 (step 420), the Internet Gatekeeper 320 scans the database 325 to determine whether another base station 25b of another wireless system 360 exists close to the currently serving base station 25a (step 425). In many cases, there may be more than one potential target base station 25b within one or more types of wireless systems 360. The coverage area of the other base station(s) 25b may completely overlap, partially overlap or at least be adjacent to the coverage area of the serving base station 25a.

Alternatively, instead of location information for each base station 25a and 25b, the identity information 328 can include a list of all MSCs 14a and 14b for each type of wireless system 350 and 360 within the Internet Gatekeeper 320 area. To determine whether another wireless system 360 exists nearby (step 425), the Internet Gatekeeper 320 can multicast the identity message 315 received from the GSM MSC 14a to all of the MSCs 14b in the Internet Gatekeeper 320 area via the Internet 330 and an Internet Gateway 310b for each type of wireless system 360, and request base station 25b identity information from the MSCs 14b for each base station 25b that has an overlapping or adjacent coverage area to the serving base stations 25a coverage area.

If, after consulting the database 225 and/or multicasting the identity message 315, the Internet Gatekeeper 320 determines that there are no target base stations 25b nearby to perform a handover of the call to (step 425), the Internet Gatekeeper 320 transmits a rejection message (not shown) to the GSM MSC 14a via the Internet Gateway 310a associated with the GSM MSC 14a, indicating that no other wireless systems exist nearby. However, if the Internet Gatekeeper 320 does identify potential target base stations that the call might be able to be handed over to based upon the information retrieved from the database 325 or received from the MSCs 14b of the other wireless systems 360 (step 425), the Internet Gatekeeper 320 can compile a list 355 of identities 356 of these potential target base stations 25b (step 435), along with location information 358 for each potential target base station 25b and an indication of the MSC 14b associated with each potential base station 25b. It should be understood that this list 355 can contain one or more base station identities 356. Thereafter, the Internet Gatekeeper 320 can send this list 355 of potential target base station identities 356 and the MSCs 359 that each are associated with to the GSM MSC 14a via the Internet Gateway 310a associated with the GSM MSC 14a (step 440).

Upon receiving this list 355, the GSM MSC 14a sends a request to the MS 20a via the serving base station 25a, asking the MS 20a to change its frequency and transmit a measurement report from the neighboring cell(s) 22b of the new wireless system(s) 360 back to the GSM base station 25a (step 445). The GSM base station 25a checks the measurement report for each potential target base station 25b, and selects the best target base station 25b with which to perform the handover (step 450). Alternatively, the GSM MSC 14a can select the target base station 25b with which to perform the handover from the location information 358 provided with the list 355 from the Internet Gatekeeper 320. It should be understood that selection of the appropriate target base station 25b may be performed differently by different wireless systems 360. For example, in the D-AMPS system 360, the serving MSC 14b sends a Handover Measurement request to the different candidate MSC's, instructing the candidate MSCs to perform the signal strength measurements for each potential target base station that they serve and report back the results.

Once the target base station 25b has been selected (step 450 and 452), the GSM MSC 14a determines the identity of the associated MSC 14b from the MSC identity information 359 included in the list 355 and sends the Handover Request message to the target MSC 14b serving the target base station 25b of the D-AMPS system 360 via the Internet Gateway 310a associated with the GSM MSC 14a, the Internet Gatekeeper 320 and the Internet Gateway 310b associated with the D-AMPS wireless system 360 (step 455). The Internet Gateway 310a associated with the GSM MSC 14a converts the GSM Handover Request message into IP packets and transmits the IP packets to the Internet Gatekeeper 320 via the Internet 330. The Internet Gatekeeper 320 routes the IP packets to the appropriate Internet Gateway 310b associated with the D-AMPS wireless system 360, which, in turn, converts the IP packets into an equivalent D-AMPS message. Alternatively, the Handover Request message could be sent via just the Internet Gateways 310a and 310b, without involving the Internet Gatekeeper 320.

The process continues as normal for the D-AMPS system 360, by the D-AMPS MSC 14b allocating resources (step 460), such as a traffic channel and voice trunks between the D-AMPS MSC 14b and the GSM MSC 14a. When the D-AMPS MSC 14b is ready for the handover, the D-AMPS MSC 14b responds back to the GSM MSC 14a with the new voice channel information via the Internet Gateways 310a and 310b and the Internet Gatekeeper 320 (step 465). Thereafter, a link is established between the GSM MSC 14a and the D-AMPS MSC 14b via the Internet Gateways 310a and 310b and the Internet Gatekeeper 320 (step 470).

To complete the handover, the GSM MSC 14a transmits the Handover command to the MS 20 (step 475), the MS 20 tunes to the new channel and establishes communications with the D-AMPS base station 25b (step 480). Thereafter, the MS 20 sends the Handover Complete message to the GSM MSC 14a via the D-AMPS base station, D-AMPS MSC 14b, Internet Gateways 310a and 310b and Internet Gatekeeper 210 (step 485), and the call is switched through from the GSM MSC 14a to the D-AMPS MSC 14b (step 490).

The GSM MSC 14a starts forwarding payloads (voice or data) received from the subscriber involved in the call connection with the MS 20 via the Internet Gateways 310a and 310b and the Internet Gatekeeper 320 to the D-AMPS MSC 14b, which, in turn, forwards the payloads to the MS 20 via the D-AMPS base station 25b. The GSM Internet Gateway 310a stores the payloads in a jitter buffer (not shown) to ensure proper delivery of the payloads to the D-AMPS MSC 14b. In turn, the D-AMPS base station 25b forwards payloads received from the MS 20 to the GSM MSC 14a via the D-AMPS MSC 14b, Internet Gateways 310a and 310b and Internet Gatekeeper 320. The GSM MSC 14a forwards these payloads to the other subscriber depending upon the nature of the subscriber. For example, the payloads may need to be sent the GSM base station 25a if the other subscriber is a mobile subscriber registered with the GSM MSC 14a. The GSM MSC 14a retains the main control of the call until the call is cleared.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A telecommunications system for performing a handover of a call associated with a mobile station between different wireless systems, comprising:
   first and second wireless systems, said first wireless system being in wireless communication with said mobile station for said call, said first wireless system determining that said handover of said call needs to be performed to said second wireless system; and
   an Internet Gatekeeper within an Internet system for receiving an identity message from said first wireless system, determining an identity of said second wireless system for said handover and sending at least said identity of said second wireless system back to said first wireless system, said handover of said call being performed from said first wireless system to said second wireless system via said Internet system.

2. The telecommunications system of claim 1, further comprising:
   at least one Internet Gateway in communication with said first and second wireless systems and said Internet Gatekeeper, said at least one Internet Gateway converting protocols of handover messages between said first and second wireless systems during said handover.

3. The telecommunications system of claim 2, wherein said at least one Internet Gateway further comprises:
   a first Internet Gateway associated with said first wireless system for receiving first ones of said handover messages from said first wireless system, converting said first handover messages into Internet Protocol (IP) packets and routing said IP packets to said Internet Gatekeeper; and
   a second Internet Gateway associated with said second wireless system for receiving said IP packets from said Internet Gatekeeper, converting said IP packets into second ones of said handover messages corresponding to said first handover messages but in a protocol of said second wireless system and transmitting said second handover messages to said second wireless system.

4. The telecommunications system of claim 1, further comprising:
   a serving base station within said first wireless system in wireless communication with said mobile station, said identity message including location information for said serving base station.

5. The telecommunications system of claim 4, wherein said location information includes coordinates of said serving base station and a coverage radius for said serving base station.

6. The telecommunications system of claim 5, wherein said Internet Gatekeeper determines said identity of said second wireless system based upon said location information.

7. The telecommunications system of claim 6, further comprising:
   a database within said Internet Gatekeeper for storing identity information for all wireless systems within an area served by said Internet Gatekeeper.

8. The telecommunications system of claim 7, wherein said identity information includes a list of identities of target base stations.

9. The telecommunications system of claim 8, wherein said identity of said second wireless system comprises said identity of a select one of said target base stations within said second wireless system, said select target base station having a coverage area at least adjacent to a coverage area for said serving base station.

10. The telecommunications system of claim 8, wherein said Internet Gatekeeper sends said identities of select ones of said target base stations to said first wireless system, said select target base stations having a coverage area at least adjacent to a coverage area for said serving base station, said first wireless system selecting a given one of said select target base stations to perform said handover to, said identity of said second wireless system comprising said identity of said given target base station.

11. The telecommunications system of claim 8, wherein said identity information includes a list of mobile switching centers within all wireless systems within said area served by said Internet Gatekeeper.

12. The telecommunications system of claim 11, wherein said Internet Gatekeeper multicasts said identity message to select ones of said mobile switching centers on said list that are within a different wireless system than said first wireless system.

13. The telecommunications system of claim 12, wherein said select mobile switching centers provide identities of target base stations served by said select mobile switching centers that have a coverage area at least adjacent to a coverage area of said serving base station to said Internet Gatekeeper.

14. The telecommunications system of claim 13, wherein said Internet Gatekeeper sends said identities of said target base stations to said first wireless system, said first wireless system selecting a select one of said target base stations to perform said handover to, said identity of said second wireless system comprising said identity of said select target base station.

15. The telecommunications system of claim 1, wherein said handover messages comprises signaling messages.

16. The telecommunications system of claim 1, wherein said handover messages include payloads.

17. The telecommunications system of claim 1, further comprising:
   a first mobile switching center within said first wireless system for sending said first identity message.

18. The telecommunications system of claim 17, further comprising:
   a second mobile switching center within said second wireless system, said handover messages being transmitted between said first and second mobile switching centers via said Internet Gatekeeper.

19. A method for performing a handover of a call associated with a mobile station between different wireless systems, comprising the steps of:
   determining, by a first wireless systems in wireless communication with said mobile station for said call, that said handover needs to be performed;

receiving, by an Internet Gatekeeper within an Internet system, an identity message from said first wireless system to determine an identity of a second wireless system to perform said handover to;

sending at least said identity of said second wireless system from said Internet Gatekeeper back to said first wireless system; and performing said handover of said call from said first wireless system to said second wireless system via said Internet system.

20. The method of claim 19, wherein said step of performing further comprises the step of:

converting protocols of handover messages between said first and second wireless systems during said handover of said call from said first wireless system to said second wireless system by at least one Internet Gateway in communication with said first and second wireless systems and said Internet Gatekeeper.

21. The method of claim 20, wherein said step of converting further comprises the steps of:

receiving, by a first Internet Gateway associated with said first wireless system, first ones of said handover messages from said first wireless system;

converting, by said first Internet Gateway, said first handover messages into Internet Protocol (IP) packets; and transmitting said IP packets from said first Internet Gateway to said Internet Gatekeeper.

22. The method of claim 21, wherein said step of converting further comprises the steps of:

receiving, by a second Internet Gateway associated with said second wireless system, said IP packets from said Internet Gatekeeper;

converting, by said second Internet Gateway, said IP packets into second ones of said handover messages corresponding to said first handover messages but in a protocol of said second wireless system; and transmitting said second handover messages from said second Internet Gateway to said second wireless system.

23. The method of claim 19, wherein said step of receiving further comprises the step of:

receiving said identity message including location information for a serving base station within said first wireless system serving said mobile station.

24. The method of claim 23, further comprising the step of:

determining, by said Internet Gatekeeper, said identity of said second wireless system based upon said location information.

25. The method of claim 24, wherein said step of determining further comprises the step of:

storing, within a database within said Internet Gatekeeper, identity information for all wireless systems within an area served by said Internet Gatekeeper.

26. The method of claim 25, wherein said step of storing further comprises the step of:

storing a list of identities of target base stations, said list comprising said identity information.

27. The method of claim 26, wherein said step of determining further comprises the step of:

determining said identity of said second wireless system as said identity of a select one of said target base stations within said second wireless system, said select target base station having a coverage area at least adjacent to a coverage area for said serving base station.

28. The method of claim 26, wherein said step of sending further comprises the steps of:

sending, by said Internet Gatekeeper, said identities of select ones of said target base stations to said first wireless system, said select target base stations having a coverage area at least adjacent to a coverage area for said serving base station; and selecting, by said first wireless system, a given one of said select target base stations to perform said handover to, said identity of said second wireless system comprising said identity of said given target base station.

29. The method of claim 25, wherein said step of storing further comprises the step of:

storing, within said database, a list of mobile switching centers within all wireless systems within said area served by said Internet Gatekeeper, said list comprising said identity information.

30. The method of claim 29, wherein said step of determining further comprises the step of:

multicasting, by said Internet Gatekeeper, said identity message to select ones of said mobile switching centers on said list that are within a different wireless system than said first wireless system.

31. The method of claim 30, wherein said step of determining further comprises the step of:

providing, by said select mobile switching centers, identities of target base stations served by said select mobile switching centers that have a coverage area at least adjacent to a coverage area of said serving base station to said Internet Gatekeeper.

32. The method of claim 31, wherein said step of sending further comprises the steps of:

sending, by said Internet Gatekeeper, said identities of said target base stations to said first wireless system; and selecting, by said first wireless system, a select one of said target base stations to perform said handover to, said identity of said second wireless system comprising said identity of said select target base station.

33. The method of claim 19, wherein said step of receiving further comprises the step of:

receiving said identity message from a first mobile switching center within said first wireless system.

34. The method of claim 33, wherein said step of performing further comprises the step of:

transmitting handover messages between said first mobile switching center and a second mobile switching center within said second wireless system via said Internet.

* * * * *